July 9, 1935.  A. R. MELLOR  2,007,207
MILK PAIL HOLDER
Filed Aug. 10, 1933
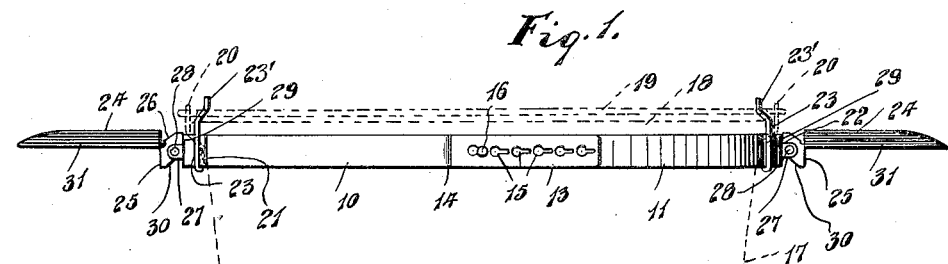
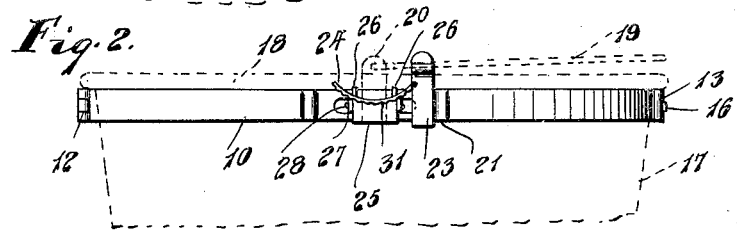
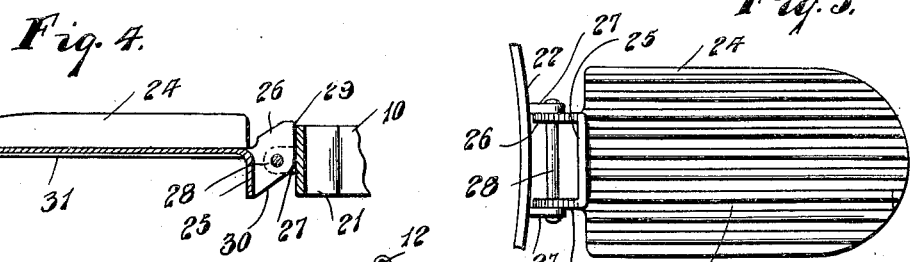
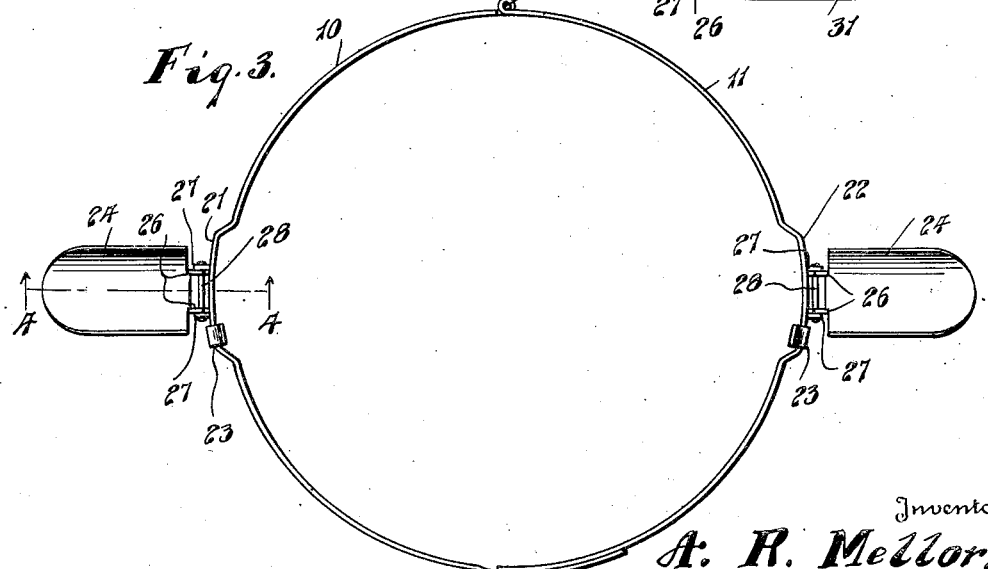
Inventor
A. R. Mellor.
By L. F. Randolph Jr.
Attorney Patented July 9, 1935

2,007,207

UNITED STATES PATENT OFFICE 2,007,207

MILK PAIL HOLDER

Adrien R. Mellor, Beaumont, Calif.

Application August 10, 1933, Serial No. 684,572

1 Claim. (Cl. 31—54)

The invention relates to means for supporting a milk pail between the legs of a cow milker and has for its object the provision of an improved means for supporting the pail that is adjustable to fit different sizes of pails, that will securely hold the device engaged on the pail and prevent it dropping from the pail when the pail is lifted by its bail, and that has means hingedly secured on diametrically opposite sides of the holder to rest on the legs of the cow milker, said means being roughened or corrugated to prevent it from slipping on the operator's legs.

The invention will be described in detail hereinafter and will be found illustrated in the accompanying drawing in which Figure 1 is a side view in elevation of a milk pail shown in dotted lines and broken away, with the milk pail holder shown applied thereto, Figure 2 is a similar view looking at the holder from a point 90 degrees removed from the point of view of Figure 1, Figure 3 is a top plan view of the milk holder, Figure 4 is a sectional detail on a plane indicated by the line 4—4 of Figure 3, and Figure 5 is a bottom plan view of one of the supporting means shown applied to a fragment of the pail encircling band.

In the drawing similar reference characters are used to designate corresponding parts in all of the views.

The milk pail holder includes a pail encircling band comprising two sections, 10 and 11, hingedly secured at adjacent ends as shown at 12. The free end of the band section 10, designated 13 is offset as shown at 14 from the remainder of the band and provided with a plurality of keyhole openings 15 to selectively receive a headed stud 16 secured to the free end of the band section 11, this structure permitting of adjusting the length of the band to fit milk pails 17 of different sizes so that the band sections 10 and 11 will snugly fit under an outer rolled bead 18 of the milk pail. 19 indicates a bail for the pail 17 having its ends engaged in the ears 20 secured to the pail.

To accommodate the ears 20 of the pail, the band sections 10 and 11 have offset portions 21 and 22 respectively, and secured to said offset portions 21 and 22 are spring clips 23 having their upper free ends inwardly directed relatively to the band as shown at 23' to engage over the bead 18 and hold the band on the pail when lifted by the bail 19.

Hingedly secured to the offset portions 21 and 22 are concavo-convex plates 24 having downturned flanges 25 from which project ears 26 that are hingedly secured between ears 27 projecting from said offset portions 21 and 22 by means of hinged pins 28. Ears 26 have angularly related shoulders 29 and 30, shoulders 29 being so disposed as to hold the plates 24 in substantial parallelism with the edges of the band sections 10 and 11 as shown best in Figure 4, while the shoulders 30 are adapted to hold the plates 24 in an outwardly and downwardly inclined position by engaging the outer surface of the band when the pail is supported by its bail 19, this providing means whereby the pail and its holder may be placed in position for support on the legs of a cow milker, the plates 24 seating on the operator's legs and moving into the position shown in Figure 4 automatically when the device is placed between the legs. The under faces of the legs 24 are roughened by parallel grooves forming corrugations as shown at 31, this providing means whereby the pail and its holder will be securely positioned on the milker's legs and will prevent slipping relatively thereto. The concavo-convex plates 24 are designed with rounding upward edges which permit any desired tilt of a milk pail, while placed between a cow milker's legs, preventing the edges of plates 24 from pressing against or coming in contact with the milker's legs and making them sore.

It is to be understood that the invention is not restricted to the precise or exact arrangement of parts illustrated and described, as details of construction may be modified and rearranged without departing from the spirit of the invention, the scope being limited only by the terms of the appended claim.

What is claimed is:—

A milk pail holder, comprising a band having arcuate sections hingedly secured end to end and having means to adjustably secure their free ends together to provide an annulus to surround a milk pail adjacent to its upper edge, each of said sections being provided with outwardly offset portions to avoid bail ears on the pail, spaced ears on said offset portions, leg engaging plates having downturned flanges, ears projecting from said flanges pivotally mounted between said spaced ears and having angularly related shoulders to hold said plates in substantially horizontal positions and downwardly inclined positions respectively, and clips secured to the sections to engage the rim of the pail and hold the band thereon.

ADRIEN R. MELLOR.